United States Patent [19]

Buchholz et al.

[11] 4,360,326
[45] Nov. 23, 1982

[54] OIL LUBRICATED VACUUM PUMP INCLUDING AN OIL SEPARATOR DISPOSED ADJACENT OF ITS SUCTION OPENING

[75] Inventors: Peter Buchholz; Rolf Warnecke, both of Gifhorn, Fed. Rep. of Germany

[73] Assignee: Volkswagenwerk AG, Wolfsburg, Fed. Rep. of Germany

[21] Appl. No.: 117,290

[22] Filed: Jan. 31, 1980

[30] Foreign Application Priority Data

Feb. 8, 1979 [DE] Fed. Rep. of Germany ....... 2904686

[51] Int. Cl.³ .................. F04C 27/02; F04C 29/02
[52] U.S. Cl. .................. 418/97; 418/DIG. 1; 137/854; 55/420; 55/439
[58] Field of Search .................. 418/97–100, 418/DIG. 1; 137/854; 55/417, 420, 439, 437

[56] References Cited

U.S. PATENT DOCUMENTS

| 1,491,993 | 4/1924 | McCuen | 418/97 |
| 3,160,487 | 12/1964 | Risse et al. | 55/417 |
| 3,968,897 | 7/1976 | Rodgers | 137/854 |
| 4,164,384 | 8/1979 | Hertell | 418/97 |

FOREIGN PATENT DOCUMENTS

| 2315870 | 10/1974 | Fed. Rep. of Germany | 137/854 |
| 2755328 | 9/1978 | Fed. Rep. of Germany | 418/97 |
| 613386 | 11/1948 | United Kingdom | 55/417 |
| 912119 | 12/1962 | United Kingdom | |

Primary Examiner—John J. Vrablik
Attorney, Agent, or Firm—Spencer & Kaye

[57] ABSTRACT

An oil separator in combination with an oil lubricated vacuum pump. The separator includes a hollow housing having one end disposed adjacent the suction opening of the pump and the other end adapted for attachment to a vacuum line. A valve seat comprises an internal surface of the housing, and a resilient elastic sealing element having a relatively low mass is positioned under tension on the valve seat between the seat and the suction opening. The sealing element permits a stream of air from the vacuum line to enter the suction opening of the pump while preventing oil from the pump from passing into the vacuum line.

5 Claims, 7 Drawing Figures

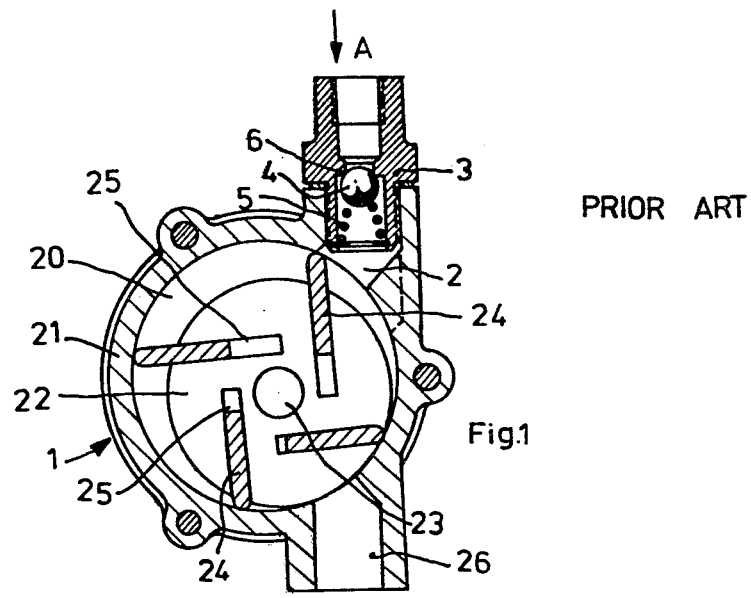
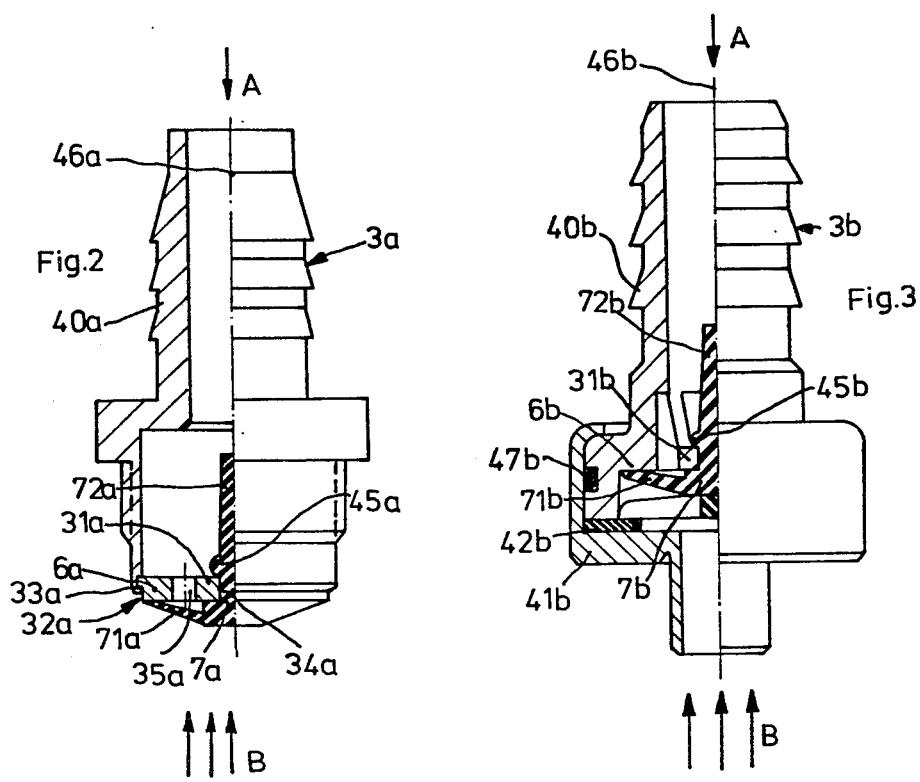

OIL LUBRICATED VACUUM PUMP INCLUDING AN OIL SEPARATOR DISPOSED ADJACENT OF ITS SUCTION OPENING

BACKGROUND OF THE INVENTION

The present invention relates to an oil lubricated vacuum pump and, in particular, to an oil separator for this type of pump.

British Pat. No. 912,119 discloses an oil lubricated vacuum pump employing a valve-type oil separator disposed adjacent the suction opening of the pump and adapted for coupling to a vacuum line. The separator comprises a spherical or ball element which is pressed against a valve seat of the separator by a helical spring. The ball, valve seat and helical spring are arranged and dimensioned so that the stream of air sucked out of the vacuum line can pass into the vacuum pump whereas oil ejected toward the suction opening by the vacuum pump during operation is prevented from entering the vacuum line.

The results obtained with such prior art vacuum pumps are not completely satisfactory because it is difficult to make the ball valve-valve seat interface sufficiently tight and, after sustained periods of operation, enough oil enters the vacuum line to adversely influence the operation of the connected vacuum boosters and other equipment.

A satisfactory design of such prior art ball valve oil separators is realizable only with difficulty because two contradictory requirements must be met. On the one hand, the valve element should be pressed onto the valve seat with a comparatively large spring force to produce the desired tightness and reliably prevent the valve element from lifting off the seat when the acceleration surges generated by the vacuum pump are large. On the other hand, the valve element should be pressed into the valve seat with as little spring force as possible to permit the stream of air sucked in by the vacuum pump to pass with as little loss as possible since any intermediate biased valve represents a loss of attainable vacuum. The comparatively large masses of the known valve-type oil separators used in prior art vacuum pumps make satisfactory dimensioning of these prior art oil separators particularly difficult.

It is an object of the present invention to provide an oil separator for an oil lubricated vacuum pump which prevents the entrance of oil into the vacuum line under all conceivable operating conditions, including large acceleration surges, without there being any noticeable reduction in utilizable vacuum pressure.

SUMMARY OF THE INVENTION

The present invention comprises an oil separator in combination with an oil lubricated vacuum pump. The separator includes a hollow housing having one end disposed adjacent the suction opening of the pump and the other end adapted for attachment to a vacuum line. A valve seat comprises an internal surface of the housing, and a resilient elastic sealing element having a relatively low mass is positioned under tension on the valve seat between the seat and the suction opening. The sealing element permits a stream of air from the vacuum line to enter the suction opening of the pump while preventing oil from the pump from passing into the vacuum line.

BRIEF DESCRIPTION OF THE DRAWINGS

FIG. 1 is a cross-sectional view of a lubricated vane-type vacuum pump having a prior art oil separator; and FIGS. 2–7 show various modifications of the oil separator according to the invention which replace the oil separator of FIG. 1.

DETAILED DESCRIPTION OF THE PREFERRED EMBODIMENTS

Figure 4:
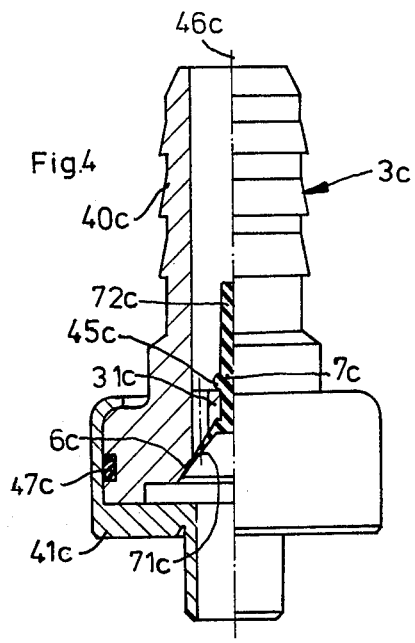

Referring to FIG. 1, there is shown a lubricated vane-type vacuum pump 1 of the kind disclosed in British Pat. No. 912,119. The pump comprises a working chamber 20 defined by an outer cylindrical wall 21 and a rotor 22 rotatably mounted on a hub 23. The rotor 22 is provided with sliding vanes 24 mounted in chordal slots 25 in the body of the rotor. The discharge opening for the vacuum pump is shown at 26. Provision is made for conducting lubricating oil to all of the working parts by ports and passages not shown in the drawing and which form no part of the present invention.

An oil separator 3 having a threaded pipe end for connection to a vacuum line (not shown) is coupled to the vacuum pump adjacent the suction opening 2 of the pump, the vacuum line leading, for example, to a motor vehicle vacuum brake booster. The oil separator 3 is provided with a valve seat 6 and a ball-shaped valve element 4 which is firmly pressed against the valve seat by a helical spring 5.

The valve element 4, valve seat 6 and spring 5 are dimensioned and matched in such a way that the stream of air sucked by the vacuum pump through the vacuum line can pass into the suction opening 2 in the direction indicated by the arrow A. On the other hand, oil which during operation is expelled by the vacuum pump from the cylindrical interior of the pump into the suction opening 2, is prevented from entering the vacuum line.

Further features of the vacuum pump are not shown in detail since they do not form a part of the present invention. Also, it shall be understood that the suction opening of the vacuum pump may also be disposed, contrary to the illustrated embodiment, on one of the two frontal faces of the vacuum pump.

FIGS. 2 to 7 show oil separators 3a–3f in accordance with the invention, which may be used to replace the oil separator 3 of FIG. 1.

Figure 5:
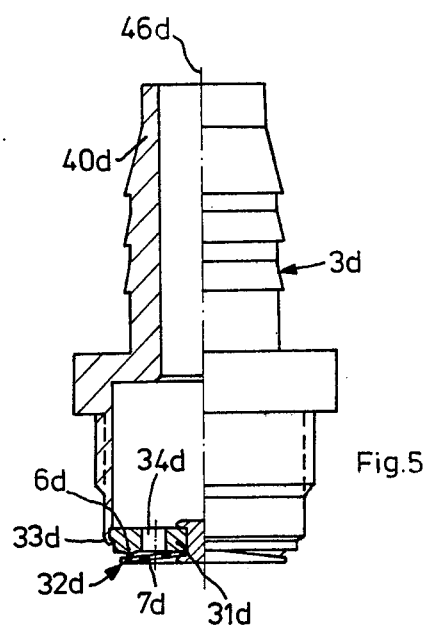
Figure 6:
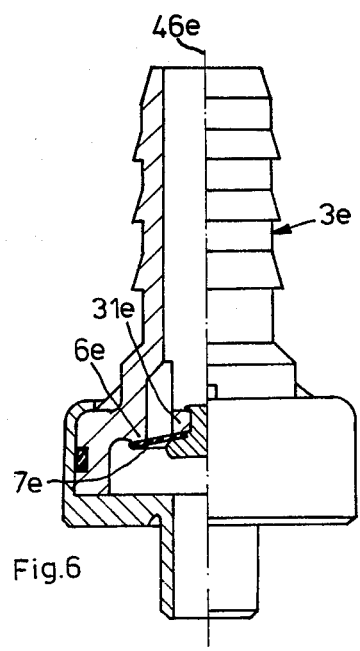
Figure 7:
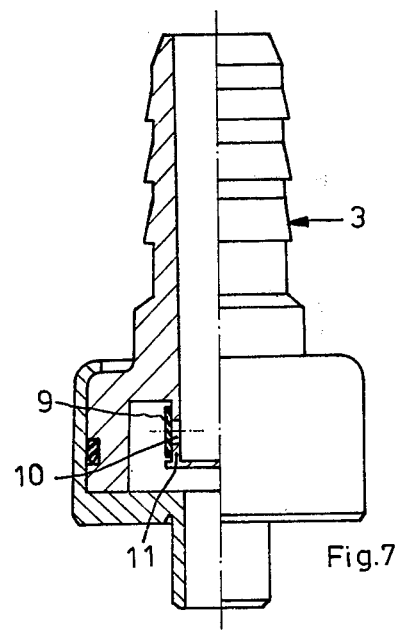

As can be seen in FIGS. 2 to 7, the valve element comprises a naturally resilient elastic seal in the form of an elastic lip, as shown in FIGS. 2 to 6, or an elastic ring, as shown in FIG. 7. The elastic seals of FIGS. 2 to 7 are composed of rubber or rubberlike plastic materials, for example fluoro silicone rubber (Fluorsilikonkautschuk), nitrile rubber (Nitrilkautschuk), epichlorohydrin rubber (Epichlorhydrinkautschuk) or polyurethane.

The elastic seal presses against the valve seat with tension and has a small mass compared to the valve elements of conventional ball or disc check valves. For example, the movable mass of an elastic seal of the type shown in FIGS. 2 to 7 would typically be between 0.05 and 0.06 gram whereas the mass of a conventional ball or disc check valve for the same size pump is in the range 0.2 to 0.6 gram provided that the ball or disc is a plastic and not a metallic one.

Due to its small resilient mass, contact of the elastic seal against the valve seat is assured even at very large, surge-like accelerations within the vacuum pump or oil separator. At the same time, the opening pressure, which is determined only by the tension of the elastic seal resulting from its natural resiliency is substantially less than that of conventional ball or disc valves. Typical opening pressures for the elastic seals of the present invention are in the range of 0.07 to 0.15 psi whereas for the ball or disc valve they are in the range 0.35 to 1.1 psi. The subatmospheric pressure generated by the vacuum pump 1 is thus available almost to its full extent in the vacuum line and in the automobile vacuum brake booster. Entrance of oil into the vacuum line is practically impossible because the elastic seal always rests closely against the valve seat, except for the time during which the extracted stream of air A passes through the separator.

FIGS. 2, 3 and 4 show oil separators 3a, 3b and 3c in each of which there is provided a respective mushroom-shaped elastic element 7a, 7b and 7c. The elements 7a-7c have rotationally symmetrical domes 71a-71c and stems 72a-72c, respectively.

More specifically, referring to FIG. 2, a disc 32a having an outer peripheral valve seat 6a and an inner member 31a rests on an inner notched circumferential portion 33a of the housing 40a of separator 3a. The stem 72a of the elastic element 7a is held under compression in an opening 34a in inner member 31a by protruding ring-like portion 45a of the stem, the stem projecting upward along the longitudinal axis 46a of the housing. The rotationally symmetrical dome 71a of element 7a extends radially outward toward the edge of the valve seat 6a and is pressed under tension against seat 6a thereby covering the passages 35a connecting a vacuum line coupled to separator 3a to the suction opening of the vacuum pump. In operation, air sucked out of the vacuum line in the direction of arrow A passes through the apertures 35a and displaces the symmetrical dome portion 71a of elastic element 7a downward allowing air to enter the suction port 2 (FIG. 1) of the pump. However, oil splashed toward the oil separator 3a in the direction of B is blocked by the elastic element 7a and cannot enter the vacuum line coupled to the separator.

FIG. 3 shows a second embodiment of the invention in which the valve seat 6b is integral with the internal surface of housing 40b and the outer periphery of elastic element 7b is pressed under tension against the seat. Ribbed elements attach the inner member 31b to the housing 40b and a socket member 41b is separated from the housing 40b by a non-metallic washer 42b and sealing ring 47b.

The embodiment of FIG. 4 is similar to that of FIG. 3 except that the interface of the elastic element 7c and seat 6c is along a conical section making an acute angle with the longitudinal axis of the housing 40c, the washer 42b is omitted and the elements connecting inner member 31c to the housing have a different configuration, as shown. The operation of the embodiments of FIGS. 3 and 4 is the same as that of the structure shown in FIG. 2. The embodiments of FIGS. 2, 3 and 4 are particularly advantageous because they can be easily manufactured and are operationally efficient.

The embodiments of FIGS. 5 and 6 comprise an oil separator in which the rubber elastic seals are in the form of elastic discs 7d and 7e, respectively. The center region of each disc is fastened to an inner member 31d, 31e in such a manner that its edge region is pressed under tension against the valve seat 6d, 6e thereby closing the passages leading toward the interior of the vacuum pump.

FIG. 7 shows a further variation of the oil separator according to the invention. In this embodiment, the openings leading to the interior of the vacuum pump are formed as radial passages 10 in a cylindrical plug 11. The seal is provided in the form of a resilient elastic ring 9 enclosing the cylindrical plug.

In each of the embodiments of FIGS. 2-7, the oil separators 3a-3f have differently shaped housings. These differences are essentially without significance for the proper operation of the invention and are adapted to the requirements of the respective vacuum pump housing.

It will be understood that the above description of the present invention is susceptible to various modifications, changes and adaptations, and the same are intended to be comprehended within the meaning and range of equivalents of the appended claims.

What is claimed is:

1. In combination with an oil lubricated vacuum pump having a suction opening, an oil separator comprising:
   a hollow housing having a longitudinal axis and a first end disposed adjacent said suction opening, said housing further having a second end for attachment to a vacuum line;
   a valve seat surrounding the longitudinal axis of said housing and comprising a surface thereof; and
   a naturally resilient elastic sealing element having a relatively low mass positioned under tension on said valve seat between said valve seat and said suction opening, the tension on said sealing element being caused solely by the natural resiliency of said sealing element as it engages said valve seat, said sealing element permitting a stream of air from said vacuum line to enter said suction opening while preventing oil from said vacuum pump from passing into said vacuum line.

2. An oil separator as defined in claim 1 wherein said elastic sealing element comprises an approximately rotationally symmetrical lip for making contact with said valve seat.

3. An oil separator as defined in claim 2 which further comprises an inner member surrounding the longitudinal axis of said housing and located between said valve seat and said axis; and wherein said sealing element has a mushroom-shape, the stem of said sealing element being secured within an opening in said inner member and extending toward the second end of said housing along said longitudinal axis, the lip of said sealing element forming an approximately rotationally symmetrical dome for making contact with said valve seat.

4. An oil separator as defined in claim 2 which further comprises an inner member surrounding the longitudinal axis of said housing and located between said valve seat and said axis; and wherein said sealing element is in the shape of a disc secured at its center to said inner member and having an outer edge region which presses under tension on said valve seat.

5. An oil separator as defined in claim 1 wherein said valve seat comprises a cylindrical plug having radial passages therein, and said sealing element comprises an elastic ring enclosing said valve seat.

* * * * *